April 29, 1969 R. B. McLEOD 3,441,684

ANTI-SIDE TONE CIRCUIT

Filed Sept. 12, 1966

INVENTOR.
ROBERT B. McLEOD

BY

*Meyer, Tilberry & Body*

ATTORNEYS

United States Patent Office 3,441,684

Patented Apr. 29, 1969

3,441,684
ANTI-SIDE TONE CIRCUIT

Robert B. McLeod, Clinton, Mass., assignor to E. W. Bliss Company, Canton, Ohio, a corporation of Delaware Filed Sept. 12, 1966, Ser. No. 578,769
Int. Cl. H04m 1/58, 1/19
U.S. Cl. 179—81 5 Claims

ABSTRACT OF THE DISCLOSURE

Anti-side tone circuit wherein the effective impedance of the line load is transformed into essentially a constant resistive load, thereby enabling proper side tone operation for a large variety of line loads. Two parallel RLC networks of substantially equal impedance are used. One such network is in the line circuit; the other, in the hybrid balancing circuit, provides improved frequency range of operation.

Figures 1, 2:
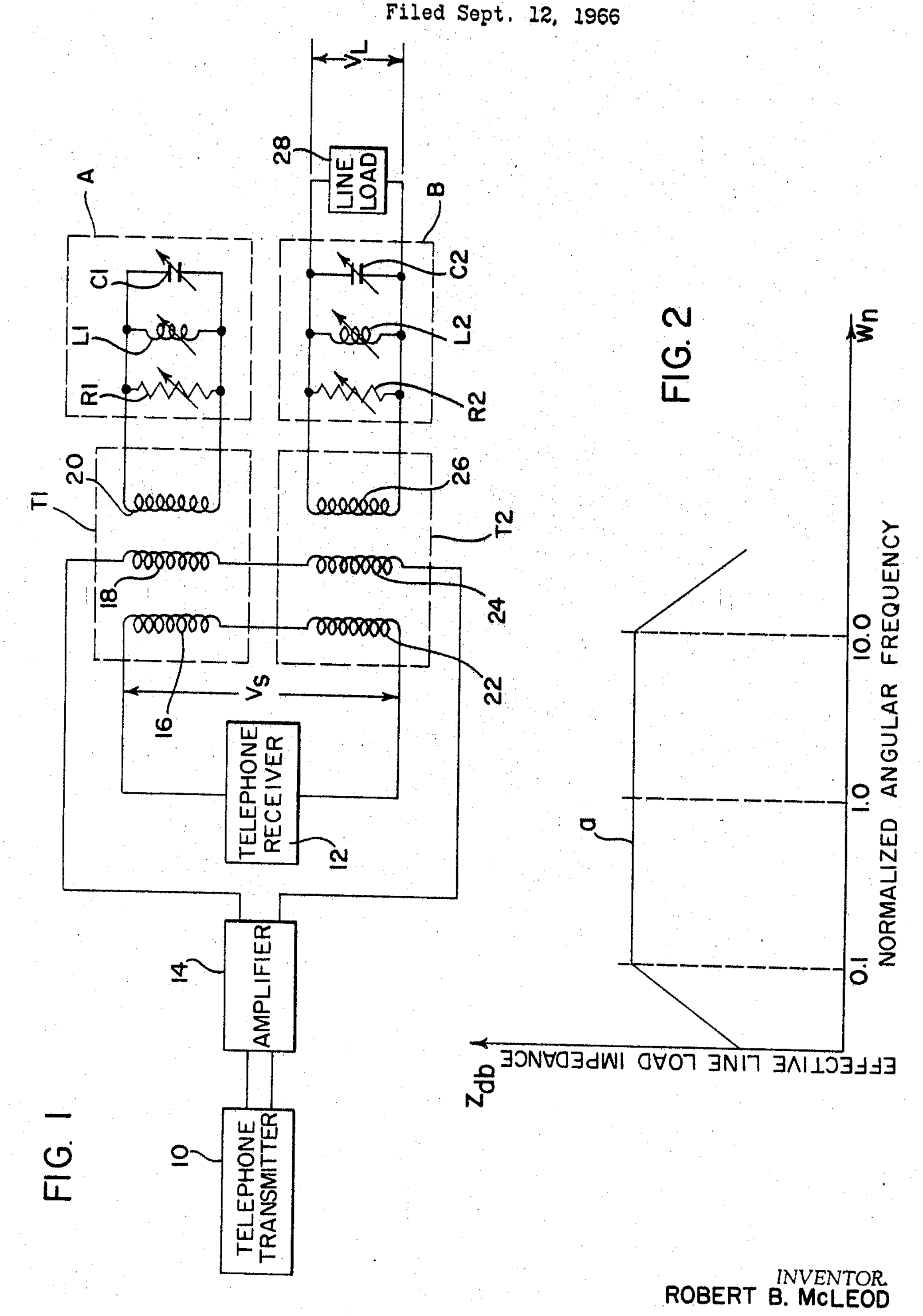

This invention relates to the art of anti-side tone circuits and, more particularly, to an improved anti-side tone circuit for substantially eliminating side tone interference.

The invention is particularly applicable for use in eliminating side tone interference during the transmitting operation of a telephone and will be described with particular reference thereto; although, it is to be appreciated that the invention has broader applications.

A typical telephone includes a microphone to transmit voice frequency signals to a remote location, and a receiver for receiving voice frequency signals. During operation, the hearing of a speaker's voice by himself is called side tone interference. This normally results in the speaker unconsciously lowering his voice and, thus, reducing the energy transmitted. In order to overcome this difficulty, telephones are normally provided with anti-side tone circuits.

A conventional anti-side tone circuit includes two transformers having three repeater windings thereon. The first winding of the first transformer and the first winding of the second transformer are connected together in series opposition across a telephone receiver. Also, the second winding of the first transformer and the second winding of the second transformer are connected together in series across the output circuit of an amplifier, which in turn has its input circuit coupled with the telephone transmitter. The third winding of the second transformer is connected across the line load and the third winding of the first transformer is connected across a balancing circuit including a variable resistor. To reduce side tone interference, the resistor is adjusted in value so that it is substantially equal to the resistance of the line load. With this adjustment, during voice transmission essentially equal voltages are developed across the first windings of the two transformers, whereby the induced voltages subtract leaving essentially no voltage across the telephone receiver. Thus, essentially no side tone interference is noted.

A problem presented by such an anti-side tone circuit as described above, is that if the system is imperfect the speaker may hear his own voice only partially attenuated or, as in some cases, the voice heard, i.e., the side tone interference, may be excessively loud depending on the overall system characteristics. This imperfection in the noted system lies, to a large extent, in the use of the balance resistor as the sole means for reducing side tone interference. Line loads are customarily not resistive, but are complex in nature. That is, the line loads are normally a combination of resistors, inductors and capacitors. Thus, whereas in the system described above the magnitudes of the voltages across the first windings of the two transformers may be equal, there may be a phase differential due to the effective impedance of the line load, whereby the induced voltages do not cancel, i.e., the side tone interference is not cancelled. Further, the effective impedance of the line load is not constant but varies with frequency, thus a balance can be obtained with a system as noted above at only one frequency thereby limiting the flexibility of such a system. Still further, such previous anti-side tone circuits as described above frequently use matched transformers and repeater coils which are expensive as opposed to ordinary low cost, stock transformers.

The present invention is directed toward an improved anti-side tone circuit, wherein the effective impedance of the line load is transformed into essentially a constant resistive load, thereby enabling proper side tone operation for a large variety of line loads, and which does not require specially constructed transformers or repeater coils, and which provides improved reduction of side tone interference as opposed to that provided by anti-side tone circuits known heretofore.

The invention contemplates an anti-side tone circuit for a network which includes a pair of transformers each having first, second and third transformer windings thereon, with the first windings being connected together in series opposition across a receiving circuit, the second windings being connected together in series across a transmitting circuit, the third winding of the second transformer being connected across a line load, and the third winding of the first transformer being connected across a balance resistor.

In accordance with the present invention, the improved anti-side tone circuit for the network described above includes a first RLC network including the balance circuit resistor, an inductor and a capacitor, all connected together in parallel across the third winding of the first transformer, and a second RLC network including a second resistor, a second inductor, and a second capacitor, all connected together in parallel with the third winding on the second transformer and the line load.

In accordance with a still further aspect of the present invention, the components within the two networks are adjusted so that the impedance of the first network is substantially that of the second network.

Still further in accordance with the present invention, the value of each resistor is low compared with the resistance of the line load, the value of each inductor is low compared to the inductance of the line load, and the value of each capacitor is high compared to the capacitance of the line load.

The primary object of the present invention is to provide an improved anti-side tone circuit for substantially eliminating side tone interference during transmitting operation of a telephone.

A still further object of the present invention is to provide an anti-side tone network which does not require the use of specially constructed transformers and repeater coils.

A still further object of the present invention is to provide an anti-side tone circuit wherein the effective impedance of the line load is transformed into an essentially constant resistive load so as to enable proper side tone operation for a large variety of line loads.

A still further object of the present invention is to provide an improved anti-side tone circuit wherein side tone interference is substantially eliminated over a large frequency range of operation thereby rendering the circuit especially valuable for use in telephone communications.

These and other objects and advantages of the invention will become apparent from the following description of the preferred embodiment of the invention as read in connection with the accompanying drawings in which:

FIGURE 1 is a circuit diagram illustrating the preferred embodiment of the invention; and FIGURE 2 is a log-log graph of effective impedance versus normalized angular frequency.

Referring now to the drawings wherein the showings are for purposes of illustrating a preferred embodiment of the invention only and not for purposes of limiting same, FIGURE 1 illustrates a telephone including a telephone transmitter 10 and a telephone receiver 12. Conventionally, the output circuit of the telephone transmitter 10 is coupled to an amplifier 14 taking the form, for example, of a push-pull transistorized amplifier, exhibiting a high output impedance. Transmitter 10 and receiver 12 are coupled to windings of a pair of transformers T1 and T2. Transformer T1 includes three windings 16, 18 and 20, and transformer T2 includes three windings 22, 24 and 26. Windings 16 and 22 are connected together in series opposition across telephone receiver 12. Also, windings 18 and 24 are connected together in series across the output circuit of amplifier 14. Winding 20 is connected across an adjustable balance resistor R1, and winding 26 is connected across a line load 28.

The circuit described thus far is conventional. During the operation of the circuit, resistor R1 is adjusted so that the resistance is equal to that of line load 28. Accordingly, during transmission of voice frequency signals by transmitter 10, theoretically equal voltages are developed across windings 16 and 22 of transformers T1 and T2. Since these windings are connected in series opposition, the induced voltages theoretically add to zero, whereby the value of the side tone voltage $V_s$ across receiver 12 is essentially zero. This theoretical result is predicated on the value of resistor R1 being equal to that of the line load 28. However, line loads are customarily not purely resistive but are complex, i.e., a combination of resistors, inductors and capacitors. Thus, whereas the voltages induced in windings 16 and 22 may be of equal value, they may be out of phase due to the effective impedance of the line load. Thus, the voltages will not cancel and the side tone voltage $V_s$ will have an appreciable value. In addition, an adjustment of resistor R1 for a particular line load impedance will not substantially reduce side tone interference over a large frequency range, since the effective impedance will vary with changes in line load frequency. Thus, whereas an initial adjustment of resistor R1 may be satisfactory at a particular line load frequency, it will not be satisfactory over a large frequency range.

In accordance with the present invention, a pair of RLC networks A and B are incorporated in the system described thus far. Network A includes balance resistor R1 together with adjustable inductor L1 and adjustable capacitor C1, all connected together in parallel across winding 20 on transformer T1. Network B includes adjustable resistor R2, adjustable inductor L2 and adjustable capacitor C2 all connected together in parallel across winding 26 between the winding and line load 28. Preferably, the value of resistor R1 is equal to that of resistor R2, the value of inductor L1 is equal to that of inductor L2, and the value of capacitor C1 is equal to that of capacitor C2. Thus, the impedance of network A is substantially equal to that of network B. Still further, the value of resistor R1 or R2 is preferably low compared to the resistance of line load 28, the value of inductor L1 or L2 is preferably low compared to the inductance of line 28, and the value of capacitor C1 or C2 is high compared to the capacitance of line load 28. By constructing networks A and B as described above, it has been found from experimentation that over a given range of frequency of operation, the impedance of the line load 28 will have little effect, if any, on the balance condition of transformers T1 and T2, whereby essentially no side tone interference, i.e., no voltage $V_s$, will be noted.

To facilitate the understanding of the invention, reference is made to the formula for calculating the magnitude of impedance of a parallel RLC circuit, such as network A or network B, wherein the formula may be represented as:

$$Z=\frac{R}{\sqrt{1+Q_o^2\left[W_n-\frac{1}{W_n}\right]^2}}$$

where:

Z=Effective line load impedance.
R=Resistance of parallel circuit in ohms.
$Q_o$=Quality of circuit.
$W_n$=Normalized angular frequency $W/W_o$.
$W_o$=Resonant frequency$=1/\sqrt{LC}$.
W=Angular frequency in radians per second.

The formula for Z may be analyzed for a variety of circuit values; however, for optimum performance the quality of circuit $Q_o$ should be of low value, on the order of 0.1, so as to provide a large band width of operation. A competent mathematician may easily plot the response of effective impedance Z for assumed values of $Q_o$. For instance, if:

$Q_o=0.1$ then at $W_n=1$, $Z=R$
at $W_n=0.1$, $Z=.707R$ (sloping at −6 db/octave below $W_n=0.1$)
at $W_n=10$, $Z=.707R$ (sloping at −6 db/octave above $W_n=10$)

A plot of response of the effective impedance Z in decibels (db) of circuit $Q_o$ equal to 0.1 appears as illustrated in the log-log graph of FIGURE 2. For test purposes of the circuit illustrated in FIGURE 1, the resonant frequency $W_o$ was selected at 700 cycles per second, the circuit quality $Q_o$ was selected at 0.1 and the capacitance of capacitors C1 and C2 was selected at 3 microfarads. Thus, from these values, each inductor L1 and L2 has a calculated value equal to 670 millihenries and each resistor R1 and R2 has a calculated value equal to 47.5 ohms. With these component values the effective impedance of the line exhibits a response similar to that as illustrated in FIGURE 2, wherein the flat portion *a* of the curve remains flat from substantially 0.1 to 10.0 values of the normalized angular frequency $W_n$. Thus, the effective impedance over the band width from 0.1 to 10.0 of the normalized angular frequency $W_n$ has been transformed into essentially a constant resistance, thereby enabling proper side tone operation over the large band width. From the experimentations it was determined that where the resistance of the circuit is low in comparison with the resistance of the line load, and a capacitance of the circuit is high in comparison with the capacitance of the line load, and the inductance is low as compared with the inductance of the line load, the effect of the line impedance is insignificant.

With the values of the resistors, inductors and capacitors as noted above, and with $Q_o$ equal to 0.1, voltage measurements were taken across line load 28 as $V_L$ and across telephone receiver 12 as $V_s$. At 500 cycles per second frequency, the measured line voltage $V_L$ was equal to 40 volts and the measured voltage $V_s$ was equal to 3 volts for a side tone reduction of 13 to 1. At a frequency of 800 cycles per second the measured voltage $V_L$ was equal to 37 volts and the measured voltage $V_s$ was equal to 2 volts for a side tone reduction of 18 to 1. At a frequency of 1 kilocycle the measured voltage $V_L$ was equal to 35 volts and the measured voltage $V_s$ was equal to 3 volts for a side tone reduction of 12 to 1. These measurements were continued for 2 kilocycles and 4 kilocycles where the side tone reduction was found to be 5 to 1 and 4 to 1, respectively. Over the audio speech band from approximately 40 cycles per second to 4,000 cycles per second, i.e., from a normalized frequency of 0.1 to 10.0, the effective impedance Z remained substantially constant, as shown by the flat portion *a* in FIGURE 2.

Although the invention has been shown in connection with a preferred embodiment, it will be readily apparent to those skilled in the art that various changes in form and arrangement of parts may be made to suit requirements without departing from the spirit and scope of the invention as defined by the appended claims.

Having thus described my invention, I claim:

1. In an anti-side tone circuit for a network including first and second transformers each having first, second and third windings, said first windings being connected together in series opposition across a receiving circuit; said second windings being connected together in series across a transmitter circuit; a line load connected across said third winding on said second transformer; and a balance circuit including a resistor connected in parallel with said third winding on said first transformer, the improvement comprising:

a first RLC network including said balance circuit resistor, an inductor and a capacitor all connected together in parallel across said third winding on said first transformer; and, a second RLC network including a second resistor, a second inductor and a second capacitor all connected together in parallel with said third winding on said second transformer.

2. In an anti-side tone circuit as set forth in claim 1 wherein the impedance of said first network is substantially that of said second network.

3. In an anti-side tone circuit as set forth in claim 1 wherein the values of said first and second resistors, said first and second inductors, and said first and second capacitors are respectively substantially equal.

4. In an anti-side tone circuit as set forth in claim 3 wherein said resistors, inductors and capacitors are manually adjustable for calibration.

5. In an anti-side tone circuit as set forth in claim 3 wherein the value of each said resistor is low compared to the resistance of said line load, the value of each said inductor is low compared to the inductance of said line load, and the value of each said capacitor is high compared to the capacitance of said line load.

References Cited

UNITED STATES PATENTS 2,589,800 3/1952 Goodale et al.
3,350,510 11/1967 Knauer et al.

KATHLEEN H. CLAFFY, *Primary Examiner.*

W. A. HELVESTINE, *Assistant Examiner.*

U.S. Cl. X.R.

179—170; 333—11